3,253,902
METHOD OF CONTROLLING WEEDS
Ferdinand Münz, Cologne-Stammheim, Ludwig Eue, Cologne-Mulheim, and Detlef Delfs, Opladen, Germany, assignors to Farbenfabriken Bayer Aktiengesellschaft, Leverkusen, Germany, a corporation of Germany
No Drawing. Filed Dec. 10, 1957, Ser. No. 701,727
Claims priority, application Germany, Dec. 21, 1956, F 21,984
2 Claims. (Cl. 71—2.6)

The present invention relates to and has as its objects herbicidal compositions and a method of employing as essential active ingredients urea derivatives which may be represented by the following formula

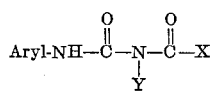

wherein Aryl stands for a phenyl or substituted phenyl radical, X stands for the group —OR or

R being a lower saturated or unsaturated alkyl radical, $R_1$ and $R_2$ being hydrogen or lower saturated or unsaturated alkyl radicals;

may also be a saturated heterocyclic ring system, Y may be H or Aryl.

Compounds of the above said type which are also named as aryl allophanic acid esters or biurets are known from the literature and are described for instance in Chemical Reviews, volume 56, pages 95 to 197, or in Houben-Weyl, Methoden der Organischen Chemie, 4th edition, 1952, pages 203 to 208 or J. of Org. Chem., volume 8, pages 230 to 238 (1943). Illustrative of the above shown compounds in the compositions and methods of the invention are such compounds in which aryl is phenyl, cresyl (o-, m- and p-cresyl), xylyl, o-, m- and p-ethyl phenyl, o-, m- and p-hydroxyphenyl, o-, m- and p-methoxyphenyl, o-, m- and p-ethoxyphenyl, o-, m- and p-acetyl phenyl, o-, m- and p-nitrophenyl, o-, m- and p-chlorophenyl, 2,4-dichorophenyl, 2,4,5-trichlorophenyl, 2-chloro-4-methyl phenyl, o-, m- and p-fluorophenyl, o-, m- and p-bromophenyl, and the like. The aryl radicals furthermore may be same or different. If X is —OR, this group may be methoxy, ethoxy, n- or i-propoxy, n- or i- or sec- or tert-butoxy, allyloxy, isopropenyloxy, butenyloxy, and the like. If X is

this group may be methyl amino, dimethyl amino, ethyl amino, diethyl amino, methyl ethyl amino, methyl propyl amino, piperidino, morpholino, and the like.

The herbicidal composition of the present invention may be prepared by usual methods, i.e. preferably by mixing the active ingredient with solid or liquid carriers or conditioning agents as they are used as pest control adjuvant or modifiers for formulations adapted for the application to soil, weeds or unwanted plants using applicator equipments. Solid compositions are preferably in the form of dusts and are compounded to give homogeneous free-flowing dusts by admixing the active compound with finely divided solids preferably talcs, natural clays, pyrophyllite, diatomaceous earth, and flours such as walnut shell, wheat, redwood, soya bean, cottonseed flours, and other inert solid carriers of the kind conventionally employed in preparing pest control compositions and dusts or powdered form.

Liquid compositions employing the active ingredients are prepared in the usual way by admixing the active ingredient with a conventional liquid diluent media. The active ingredients are quite insoluble in most liquids altho solutions containing them at low concentration can be made if desired using various of the common organic solvents such as cyclohexanol, acetone, ethanol, isobutanol, furfural, isopropyl acetate, and the like. More preferably, the liquid compositions are prepared in more concentrated form so that the liquid composition is primarily a suspension of the active compound in the liquid. In preparing such compositons conventional spray oils, alkylated naphthalene, or fats, or similar vehicles such as cottonseed oil, olive oil, lard, paraffin oil, hydrogenated vegetable oil and similar conventional organic liquid diluents are suitably employed.

The herbicidal compositions of the invention whether in the form of dusts or liquids preferably also include a surface active dispersing agent of the kind sometimes referred to in the art as wetting dispersing, and emulsifying agents.

The surface active dispersing agents employed can be of the anionic, cationic, or nonionic type and include, for example, sodium oleate, sulfonated petroleum oils, sodium lauryl sulfate, polyethylene oxides, and other surface active dispersing agents such as those listed in detail in articles by McCutcheon in Soap and Sanitary Chemicals, August, September, and October of 1949.

The amount of surface active dispersing agent employed in compositions of the invention will vary depending upon the effectiveness of the particular surface active dispersing agent employed and the properties of other materials in the composition. Generally, the surface active dispersing agent will not comprise more than about 30% by weight of the composition and with the better materials will be 5% or less.

The content of the active ingredient employed in the herbicidal compositions of the invention will vary according to the manner in which and the purpose for which the composition is to be applied but in general will be from 0.5 to 95% by weight of the composition.

The herbicidal compositions are applied either as a spray or in the form of a dust to the locus or area to be protected from undesirable plant growth. The active ingredient is, of course, applied in amount sufficient to exert the desired plant killing action. The application can be made directly upon the locus or area during the period of infestation of unwanted plant growth or alternatively the application can be made in advance of an anticipated infestation.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

Fertilizer materials, other herbicidal agents, and other pest control agents such as insecticides and fungicides can be included in the herbicidal compositions of the invention if desired.

The above mentioned compounds act particularly on dicotyledonous plants such as cress, mustard and charlock; their action is selective and therefore the combating of weeds can be effected in corn or green land with protection of the cultivated plants. With increased concentration also monocotyledonous plants can be destroyed so that at an appropriate concentration the compounds are also suitable for total weed control.

The following examples are given by way of illustration only, without however limiting the present invention thereto:

Example 1

100 mg. of 1-phenyl-5,5-dimethylbiuret are mixed with 3 ml. of acetone. 2 drops of benzyl hydroxy diphenyl polyglycol ether (containing about 15 glycol residues) are added. This premixture is diluted with water to a volume of 100 ml. This aqueous solution or its further dilutions containing 0.05% and 0.01% of active ingredient are applied to mustard and oat as follows: in the greenhouse young mustard plants (with 2 leaves) and oat of about 15 cm. height are sprayed with the solutions as prepared above. After 14 days the percentage of damage of the plants has been determined, the results having been taken from 6 parallel tests:

| Percent damage | 0.1 | 0.05 | 0.01 |
|---|---|---|---|
| Mustard, percent | 100 | 90 | 90 |
| Oat, percent | 40 | 0 | 0 |

Example 2

With the same solutions prepared as shown in Example 1 the following tests have been carried out: pots with a capacity of 400 ccm. soil and a surface area of 80 ccm. have been treated with 30 ml. of the aqueous solution in the concentration shown below, 24 hours after mustard, oat and corn have been sown in the pots. 14 days thereafter the percentage of damage of each crop has been determined. The percentage has been determined by counting the germinated seed and the young plants which just after appearance have been destroyed. The results are to be seen from the following table:

| Percent damage | 0.1 | 0.05 | 0.025 | 0.01 |
|---|---|---|---|---|
| Mustard, percent | 100 | 95 | 90 | 80 |
| Oat, percent | 90 | 60 | 0 | 0 |
| Maize (corn), percent | 0 | 0 | 0 | 0 |

Example 3

1 part by weight of 1-phenyl-5,5-dimethylbiuret has been dissolved in 4 parts of dimethyl formamide. After adding 1 part by weight of a commercial emulsifier (benzyl hydroxy diphenyl polyglycol ether as used in Example 1) the premixture has been further diluted with water. With this aqueous solution the following field tests have been carried out:

(A) Oats in normal infested soil (areas of 25 m.²) have been treated with an amount of 2, 4, 7.5, 15 and 30 kg. of active ingredient per hectare. Each test has been carried out 4 times to secure good average results. The active ingredient has been used in such an amount that in each case 1000 litres of water per hectare were sprayed on the area with a commercial spray equipment. Preventing of weed growth with 2 kg. per hectare only occured against germinating plants. An amount of 4 and 7.5 kg. per hectare completely killed the weeds without damaging the oat. 15 kg. per hectare are still tolerated by oat whereas using 30 kg. per hectare of this active ingredient oat were damaged badly. Weeds in the meaning of this example are weeds occuring in oat, barley and other grain cultures, such as Sinapis aroensis, Raphanus raphanistrum, Senecio vulgaris, Chenopodium album, Stellaria media, Polyganum spec., Galium aparine, Bellis parennis, Plantago major, Capsella bursa portaris, Souchus arvensis, Veronica spec.

(B) Spring-sown barley sown also on areas of about 25 m.² also has been treated with 5, 7.5 kg. per hectare of active ingredient (also in a liquid amount of 1000 litres per hectare). Weeds of the above type also are destroyed completely without damaging the barley.

Example 4

A 0.1% aqueous emulsion (prepared as shown above) of phenylallophanic acid allylester completely prevents the germination of mustard and oats. The methyl-, ethyl-, isopropyl- and isobutyl-esters of phenylallophanic acid have a particularly germ-inhibiting effect on mustard. Tests have been carried out exactly as described in Example 1.

Example 5

Emulsions have been prepared from 1-p-tolyl-5,5-dimethylbiuret as well as from 1-p-chlorophenyl-5,5-dimethyl-biuret as shown in Example 1; such solutions containing 1% of active ingredient completely destroy mustard and charlock when used in an amount of 1000 litres per hectare. At this concentration oats and corn are not damaged. If used 3 times the amount of active ingredient as described above (i.e. 30 kg. of active ingredient per hectare) just after sowing charlock, mustard, oat and maize, the germination of mustard and charlock did not occur, whereas corn and oat were not damaged at all.

Example 6

1-p-ethoxyphenyl-5,5-dimethylbiuret as well as 1-(4-chloro-3-nitrophenyl)-5,5-dimethylbiuret, if used as described before, inhibit the germination of charlock and mustard in an amount of 50 kg. of active ingredient per hectare, whereas oat and corn were not damaged.

Example 7

1-phenyl-5,5-dimethylbiuret in a 0.01% aqueous emulsion with the addition of an emulsifier (as described before) destroys mustard and charlock in mixed sowing with oats and in a quantity of 1000 litres per hectare without damaging the oats.

Example 8

1,3-diphenyl-5,5-dimethylbiuret has been mixed with an auxiliary solvent and emulsifier exactly as described in Example 1. This premixture has been diluted with water so that 0.1%, 0.05% and 0.01% aqueous emulsions are obtained.

These aqueous emulsions are used for the control of growing mustard and oat exactly as described in the foregoing examples. With 0.01% solutions the growing of mustard is inhibited whereas oat is not damaged. Also with 0.05% solutions mustard is destroyed, whereas oat is only slightly damaged. With 0.1% solutions also oat is inhibited in growing.

When used in pre-emergence tests in mustard and oat with emulsions with 0.01% solutions, no germination occurs with mustard whereas oat grows normally. With 0.1% solutions germination of both mustard and oat is disturbed.

We claim:

1. A method of controlling weeds which comprises applying to a locus to be protected from the weeds, in an amount sufficient to exert an herbicidal action, an active ingredient represented by the formula

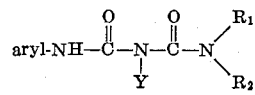

in which aryl stands for a member selected from the group consisting of phenyl, lower alkyl substituted phenyl, lower alkoxy substituted phenyl, halogen substituted phenyl and nitro substituted phenyl, $R_1$ stands for a member selected from the group consisting of lower alkyl and lower alkenyl, $R_2$ stands for a member selected from the group consisting of hydrogen, lower alkyl and lower alkenyl and when N is taken with $R_1$ and $R_2$ it is a member selected from the group consisting of piperidino and morpholino and Y is phenyl.

2. A method of claim 1 in which the active ingredient is 1,3-diphenyl-5,5-dimethylbiuret of the following formula

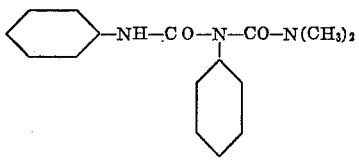

References Cited by the Examiner

UNITED STATES PATENTS

| 2,655,447 | 10/1953 | Todd | 71—2.6 |
|---|---|---|---|
| 2,663,729 | 12/1953 | Searle et al. | 71—2.6 X |
| 2,668,758 | 2/1954 | Roos et al. | 71—2.7 |
| 2,704,244 | 3/1955 | Goodhue et al. | 71—2.3 X |
| 2,723,192 | 11/1955 | Todd | 71—2.6 |
| 2,723,193 | 11/1955 | Todd | 71—2.6 |
| 2,762,695 | 9/1956 | Gerjovich | 71—2.6 |
| 2,780,535 | 2/1957 | Snyder | 71—2.6 |
| 2,849,306 | 8/1958 | Searle | 71—2.6 |
| 3,092,484 | 6/1963 | Salzberg | 71—2.6 |
| 3,189,431 | 6/1965 | Salzberg | 71—2.6 |

FOREIGN PATENTS 819,853   9/1959   Great Britain.

OTHER REFERENCES

De France et al.: "Chemical Abstracts," vol. 41, 1947, col. 6010(c).

Haas et al.: "Chemical Abstracts," vol. 48, 1954, col. 11708(c).

Jones: "Science," Sept. 24, 1954, pages 499 and 500.

Munz et al.: German application 1,032,595, printed June 19, 1958, 2 pp. spec., no dwg.

Ogata: "Chemical Abstracts," vol. 49, 1955, col. 10567(i).

Thompson et al.: "Botanical Gazette," vol. 107, pages 475–507, 1946.

LEWIS GOTTS, *Primary Examiner.*

MAURICE A. BRINDISI, GEORGE D. MITCHELL, *Examiners.*

J. E. ARMORE, JAMES O. THOMAS, JR., *Assistant Examiners.*